(12) United States Patent
Serra et al.

(10) Patent No.: US 7,533,660 B2
(45) Date of Patent: May 19, 2009

(54) METHOD FOR RECOGNIZING A FUEL TYPE IN A DIESEL ENGINE

(75) Inventors: Gabriele Serra, S. Lazzaro Di Savena (IT); Matteo De Cesare, Torremaggiore (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 0 days.

(21) Appl. No.: 11/801,003

(22) Filed: May 7, 2007

(65) Prior Publication Data

US 2008/0000450 A1   Jan. 3, 2008

(30) Foreign Application Priority Data

May 8, 2006   (EP)   .................................. 06425310

(51) Int. Cl.
*F02B 13/02* (2006.01)
*F02B 13/00* (2006.01)

(52) U.S. Cl. ........................................ 123/575; 123/434
(58) Field of Classification Search ................ 123/575, 123/1 A, 672, 434; 701/103; 73/116, 118.2, 73/119 A, 117.7
See application file for complete search history.

(56) References Cited

U.S. PATENT DOCUMENTS

| | | | |
|---|---|---|---|
| 4,640,251 A * | 2/1987 | Harada et al. ............. | 123/406.3 |
| 4,706,630 A * | 11/1987 | Wineland et al. ........... | 123/478 |
| 4,942,848 A * | 7/1990 | Terasaka ..................... | 123/1 A |
| 5,195,497 A | 3/1993 | Yoshida et al. | |
| 5,255,661 A * | 10/1993 | Nankee et al. .............. | 123/674 |
| 5,299,549 A * | 4/1994 | Schatz ......................... | 123/672 |
| 5,419,296 A * | 5/1995 | Yamaura ..................... | 123/435 |
| 5,467,755 A | 11/1995 | Konrad et al. | |
| 6,474,308 B2 | 11/2002 | Okumura et al. | |

FOREIGN PATENT DOCUMENTS

DE   3641854   6/1988
DE   10252476   5/2004

* cited by examiner

*Primary Examiner*—Mahmoud Gimie
(74) *Attorney, Agent, or Firm*—FSP LLC

(57) ABSTRACT

A method for recognizing the fuel type in a diesel engine; the method envisages determining a stoichiometric air/fuel ratio of the last type of fuel used; determining a quantity of fresh air fed to a number of cylinders of the engine; determining a quantity of fuel injected in the cylinders; determining a theoretical air/fuel ratio of combustion according to the quantity of fresh air fed to cylinders, according to the quantity of fuel injected into cylinders, and according to the stoichiometric air/fuel ratio of the last type of fuel used; determining an actual air/fuel ratio of combustion; comparing the theoretical air/fuel ratio with the actual air/fuel ratio; and recognizing the fuel type actually used according to the comparison between the theoretical air/fuel ratio and the actual air/fuel ratio.

8 Claims, 1 Drawing Sheet

METHOD FOR RECOGNIZING A FUEL TYPE IN A DIESEL ENGINE

CROSS REFERENCE TO RELATED APPLICATION

The present application claims priority to European patent application entitled METHOD FOR RECOGNIZING A FUEL TYPE IN A DIESEL ENGINE, having EPO application number 06425310.7, filed on Monday, May 8, 2006. The entire specification of the priority application is hereby incorporated by reference in its entirety for all purposes.

FIELD

The present invention relates to a method for recognising the fuel type in a diesel engine, i.e. in an engine in which the mixture is compression-ignited and not spark-ignited.

BACKGROUND

In some areas of the world (e.g. in Brazil), spark-ignited internal combustion engines are fed with different types of liquid fuel (e.g. pure petrol, hydrate alcohol, or a mixture of petrol and alcohol) which present different features (e.g. different air/fuel stoichiometric ratios). Consequently, the use of a device capable of recognising the type of fuel present in the tank in order to be able to optimise combustion control according to the type of fuel actually used was proposed for vehicles driven by spark-ignited internal combustion engines.

Currently, also modern diesel engines may use fuels other than diesel fuel which are commercially called "biodiesel" and consist of a mixture of diesel fuel and bio-mass originated fuels (e.g. vegetable oils such as rape-seed oil). However, in modern diesel engines, the engine control systems are calibrated to optimise the combustion process for diesel fuel only so as to maximise the generated mechanical power and to minimise fuel consumption and harmful emissions. Consequently, when biodiesel is used instead of diesel fuel, the engine control system calibrated to run on diesel fuel is not able to obtain an optimal combustion with a consequent considerable increase of polluting emissions (particular as concerns NOx).

From the above, it is apparent the need to define a method for recognising the fuel type in a diesel engine which is effective, efficient and inexpensive to implement in the control system of the diesel engine itself.

SUMMARY

It is the object of the present invention to provide a method for recognising the fuel type in a diesel engine which is effective, efficient and inexpensive to implement in the control system of the diesel engine itself.

According to the present invention a method for recognising the fuel type in a diesel engine is provided according to that claimed in the accompanying claims.

BRIEF DESCRIPTION OF THE DRAWING

The present invention will now be described with reference to the accompanying drawings illustrating a non-limitative embodiment example; in particular, the accompanying

DETAILED DESCRIPTION

Figure 1:
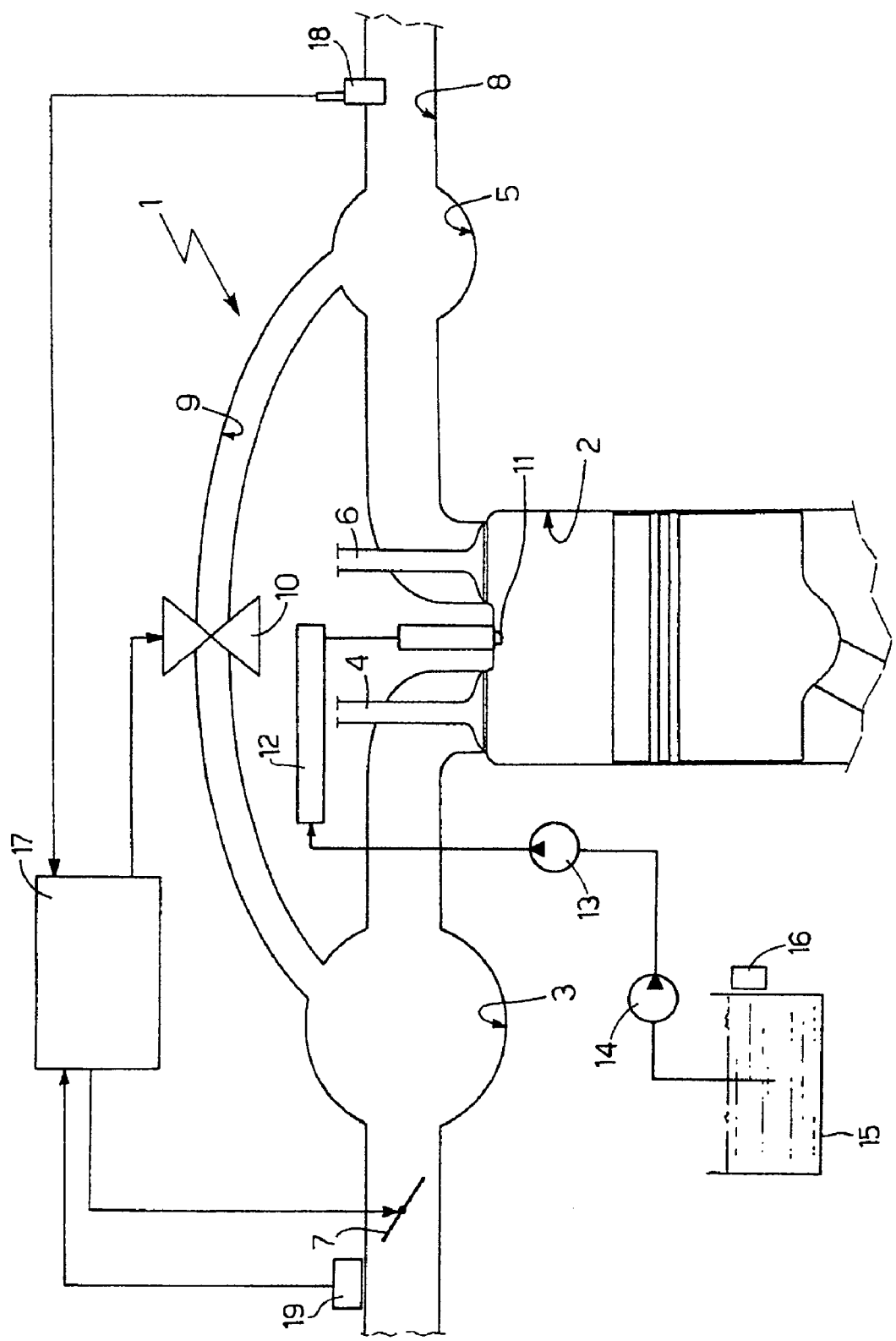
FIG. 1 is a schematic view of a diesel engine which implements the fuel type recognition method object of the present invention.

In the attached FIG. 1, number 1 indicates as a whole a diesel type internal combustion engine, i.e. an engine in which the mixture is compression-ignited and not spark-ignited. Engine 1 is provided with a number of cylinders 2 (only one of which is shown in the annexed figure), each of which is connected to an intake manifold 3 by means of at least one suction valve 4 and is connected to an exhaust manifold 5 by means of at least one exhaust valve 6. The intake manifold 3 receives cool air (i.e. air from the external environment) through a throttle valve 7 adjustable between a closed position and an all-open position. An exhaust pipe 8, which ends with a muffler (known and not shown) to release the combustion-producted gases into the atmosphere, originates from exhaust manifold 5. Furthermore, a recirculation pipe 9, which connects exhaust manifold 5 to intake manifold 3 originates from exhaust manifold 5 and is adjusted by an adjustable recirculation valve 10 between a closed position and an all-open position.

According to a preferred embodiment, a compressor (not shown) is envisaged to compress the air that is fed to intake manifold 3 and is either actuated by the gases present in the exhaust manifold (turbo charger) or actuated by the crankshaft (positive displacement compressor).

The fuel is injected directly into the top of each cylinder 2 by means of an injector 11 of the known type, which receives the pressurised fuel from a common pipe 12 (called "common rail") fed by a high pressure fuel pump 13. The high pressure fuel pump 13 receives fuel from a low pressure fuel pump 14, which primes from inside a fuel tank 15 provided with a sensor 16 for determining the quantity of fuel existing inside the fuel tank 15 itself.

Engine 1 further comprises a control unit 17, which controls throttle valve 7, recirculation valve 10, and injectors 11 for filling cylinders 2 with a quantity of combustion agent (fresh air) and fuel in a certain ratio according to the operative conditions of engine 1 and according to the commands received from a driver. A linear oxygen sensor 18 (or UEGO sensor) is connected to control unit 17, the sensor being arranged along exhaust pipe 8 to measure the quantity of fuel existing in the gases contained in exhaust pipe 8 itself. Furthermore, an air-mass meter 19 is connected to control unit 17, the meter being arranged upstream of throttle valve 7 to measure the flow rate of fresh air which flows towards cylinders 2.

According to a different embodiment (not shown), throttle valve 7 is not present and fresh air supply to the cylinders is controlled by mainly acting on recirculation valve 10.

In use, control unit 17 receives a signal proportional to the position of an accelerator pedal on which the driver acts and according to the position of the acceleration pedal adjusts the flow of fuel which is injected into cylinders 2 by injectors 11. Furthermore, control unit 17 varies the flow of fresh air which is fed to cylinders 2 so as to optimise fuel combustion inside cylinders 2 themselves. It is important to observe that particularly during transients, the air/fuel ratio (also called A/F ratio) between air (combustion agent) and the fuel may also be very far from the stoichiometric ratio (by way of example, in use the signal detected by linear oxygen sensor 18 may vary from 1.1 to 8).

Such control strategy is very different from the control strategy of a spark-ignited internal combustion engine (Otto cycle), in which the air flow rate is always related to the quantity of fuel so that combustion is always performed at the stoichiometric air/fuel ratio in order to obtain maximum efficiency of the three-way catalytic converter. In other words, in compression-ignited internal combustion engine 1 (Diesel cycle), the air/fuel ratio may also be very distant from the stoichiometric ratio and oxygen linear sensor 18 is only used to identify possible faults; instead, in a spark-ignited internal combustion engine (Otto cycle) combustion must always occur at the stoichiometric air/fuel ratio and consequently the signal provided by the linear oxygen sensor 18 constitutes the main control signal.

Below, it is described the method used by the control unit 17 to recognise the fuel type actually used by engine 1, i.e. actually existing within fuel tank 15.

Initially, control unit 17 starts from the assumption that the fuel type actually used by engine 1 is identical to the last type of fuel used; consequently, control unit 17 determines a stoichiometric air/fuel ratio of the last type of fuel used (such values are preventively stored in a memory of control unit 17).

Control unit 17 uses the air-mass meter 19 to measure a quantity of fresh air fed to cylinders 2; furthermore, control unit 17 determines a quantity of fuel injected into cylinders 2 according to the drive signals that are used to control injectors 11. Finally, control unit 17 determines an effective air/fuel ratio of the fuel by means of the measurement made by the linear oxygen sensor 18 arranged in exhaust pipe 8.

At this point, control unit 17 determines the theoretical air/fuel ratio of combustion according to the quantity of fresh air fed to cylinders 2, according to the quantity of fuel injected into cylinders 2, and according to the stoichiometric air/fuel ratio of the last type of fuel used.

The theoretical air/fuel ratio is compared with the actual air/fuel ratio and the type of fuel actually used is recognised according to the comparison between the theoretical air/fuel ratio and the actual air/fuel ratio. In particular, if the difference between the theoretical air/fuel ratio and the actual air/fuel ratio is lower than a first threshold value, then it is assumed that the fuel type used is identical to the last type of fuel used; instead, if the difference between the theoretical air/fuel ratio and the actual air/fuel ratio is higher than the first threshold value, then it is assumed that the type of fuel actually used is different from the last type of fuel used and the type of fuel actually used is determined according to the difference between the theoretical air/fuel ratio and the actual air/fuel ratio.

Preferably, in a memory of control unit 17 experimental maps are stored which, according to the type of fuel previously used and according to the difference between the theoretical air/fuel ratio and the actual air/fuel ratio, provide the type of fuel actually used.

According to a preferred embodiment, the control unit 17 assumes that the type of fuel actually used is different from the last type of fuel used only if the difference between the theoretical air/fuel ratio and the actual air/fuel ratio occurred during an interval of time shorter than a second threshold value.

From the above, it is clear that a difference between the theoretical air/fuel ratio and the actual air/fuel ratio is attributed to a change of the fuel used only if such difference is sufficiently high (higher than a first threshold value) and sufficiently rapid (lower than a second threshold value).

According to a preferred embodiment, by means of sensor 16, control unit 17 determines the quantity of fuel existing in the fuel tank 15 and recognises the type of fuel actually used only following a positive variation of the fuel quantity existing in the fuel tank 15. In other words, if there was no positive variation in the quantity of fuel present in fuel tank 15, i.e. if no fuel was added into fuel tank 15, the type of fuel existing inside the fuel tank 15 cannot have changed.

It is important to underline that the type of fuel actually used is considered different from the last type of fuel used only if the difference between the theoretical air/fuel ratio and the actual air/fuel ratio is sufficiently high (higher than the first threshold value) and sufficiently rapid (lower than the second threshold value); such condition is indispensable to discriminate between a difference due to change of fuel type and a difference due to inevitable instrumental errors and/or component drift.

The above-described identification strategy of the fuel type is particularly effective, because the diesel fuel presents a stoichiometric air/fuel ratio (equal to 14.56) very different from the stoichiometric air/fuel ratio of biodiesel (generally from 9 to 11). Consequently, a "significant" and "rapid" variation of the difference between the theoretical air/fuel ratio and the actual air/fuel ratio is attributed to the change of fuel used.

Obviously, according to the type of fuel actually used, control unit 17 changes the control parameters of engine 1 so as to be able to optimise combustion in all running conditions. In particular, according to the type of fuel actually used, control unit 17 may change the following parameters: combustion efficiency, starting instant of injections, quantity fractioning for multiple injections, combustion EGR rate target, injection pressure target, control of linear oxygen sensor 18, engine emission model and particulate filter accumulation model.

Alternatively, the above-described parameters may be changed either using several maps, each of which corresponds to a certain type of fuel, or by means of correction factors depending on the fuel type.

According to a further embodiment (not shown), the actual air/fuel ratio may be measured by means of different and more sophisticated sensors with respect to linear oxygen sensor 18; for example a NOx sensor arranged along exhaust pipe 8 may be used.

The above-described fuel type identification strategy is effective, because it allows to rapidly and accurately determine the type of fuel actually used, and is also simple and inexpensive to implement, because a high calculation power is not required and only signals that are already available in a modern diesel engine are used.

The invention claimed is:

1. A method for recognising the fuel type in a diesel engine ignited by compression of mixture; the method comprising the steps of:
   - determining a stoichiometric air/fuel ratio of the last type of fuel used;
   - determining a quantity of fresh air fed to a number of cylinders of the engine;
   - determining a quantity of fuel injected in the cylinders;
   - determining the theoretical air/fuel ratio of combustion according to the quantity of fresh air fed to cylinders, according to the quantity of fuel injected into cylinders, and according to the stoichiometric air/fuel ratio of the last type of fuel used;
   - determining an actual air/fuel ratio of combustion;
   - comparing the theoretical air/fuel ratio with the actual air/fuel ratio; and
   - recognising the fuel type actually used according to the comparison between the theoretical air/fuel ratio and the actual air/fuel ratio so that if the difference between the theoretical air/fuel ratio and the actual air/fuel ratio is lower than a first threshold value, then it is assumed that the type of fuel actually used is identical to the last type of fuel used, and if the difference between the theoretical air/fuel ratio and the actual air/fuel ratio is higher than the first threshold value, then it is assumed that the type of fuel actually used is different from the last type of fuel used.

2. A method according to claim 1, wherein the fuel type actually used is determined according to the difference between the theoretical air/fuel ratio and the actual air/fuel ratio.

3. A method according to claim 2, wherein experimental maps are used which according to the type of fuel previously used and according to the difference between the theoretical air/fuel ratio and the actual air/fuel ratio provide the type of fuel actually used.

4. A method according to claim 1, in which it is assumed that the type of fuel actually used is different from the last type of fuel used only if the difference between the theoretical air/fuel ratio and the actual air/fuel ratio occurred during an interval of time shorter than a second threshold value.

5. A method according to claim 1 and comprising the further steps of: determining a quantity of fuel existing inside a fuel tank; and recognising the fuel type actually used only following a positive variation of the quantity of fuel existing into the fuel tank.

6. A method according to claim 1, wherein the quantity of fresh air fed to the cylinders is measured by an air-mass meter arranged upstream of an intake manifold.

7. A method according to claim 1, wherein the actual air/fuel ratio of combustion is measured by means of a linear oxygen sensor arranged along an exhaust pipe.

8. A method according to claim 1, wherein the actual air/fuel ratio of combustion is measured by means of a NOx sensor arranged along an exhaust pipe.

* * * * *